US007910188B2

(12) United States Patent
Wheatley (10) Patent No.: US 7,910,188 B2
(45) Date of Patent: *Mar. 22, 2011

(54) FRICTIONAL HOLDING PAD

(75) Inventor: Alan J. Wheatley, Draper, UT (US)

(73) Assignee: American Covers, Inc., Draper, UT (US)

( * ) Notice: Subject to any disclaimer, the term of this patent is extended or adjusted under 35 U.S.C. 154(b) by 1221 days.

This patent is subject to a terminal disclaimer.

(21) Appl. No.: 11/264,669

(22) Filed: Oct. 31, 2005

(65) Prior Publication Data

US 2006/0121250 A1 Jun. 8, 2006

Related U.S. Application Data (60) Continuation-in-part of application No. 11/021,560, filed on Dec. 22, 2004, now Pat. No. 7,252,867, which is a continuation-in-part of application No. 10/684,008, filed on Oct. 10, 2003, now Pat. No. 7,125,602, which is a division of application No. 10/209,948, filed on Jul. 30, 2002, now Pat. No. 6,673,409.

(60) Provisional application No. 60/308,955, filed on Jul. 31, 2001, provisional application No. 60/344,571, filed on Dec. 28, 2001.

(51) Int. Cl.
*B32B 3/30* (2006.01)

(52) U.S. Cl. ............... 428/40.1; 428/41.3; 428/41.5; 428/42.1; 428/156; 428/160; 428/192; 428/194; 428/922

(58) Field of Classification Search .................. None
See application file for complete search history.

(56) References Cited

U.S. PATENT DOCUMENTS

| 2,128,118 | A | 8/1938 | Burford |
| 2,466,502 | A | 4/1949 | Stiller |
| 2,642,248 | A | 6/1953 | Semon |
| 3,654,047 | A | 4/1972 | Berkowitz |
| 4,749,222 | A | 6/1988 | Idland |
| 4,944,311 | A | 7/1990 | Eldridge, Jr. et al. |
| 4,986,496 | A | 1/1991 | Marentic et al. |
| 5,036,866 | A | 8/1991 | Eldrige, Jr. et al. |
| 5,358,094 | A | 10/1994 | Molinaro et al. |
| 5,508,084 | A | 4/1996 | Reeves et al. |
| 5,599,617 | A | 2/1997 | Ewald |
| 5,638,249 | A | 6/1997 | Rubino et al. |
| 5,794,767 | A | * | 8/1998 | Wilson ............... 206/37 |
| 5,899,010 | A | * | 5/1999 | Peck ................... 40/618 |
| 6,610,382 | B1 | 8/2003 | Kobe et al. |
| 6,640,477 | B1 | * | 11/2003 | Timpson et al. ......... 40/591 |
| 2005/0271847 | A1 | 12/2005 | Antonini |
| 2006/0154029 | A1 | 7/2006 | Antonini |
| 2006/0198978 | A1 | 9/2006 | Antonini |

FOREIGN PATENT DOCUMENTS

| WO | WO 02/35975 | 5/2002 |
| ZA | 20004637 | 9/2000 |

OTHER PUBLICATIONS

General Electric "Friction Pad Kit" Instructions Field Made for MPD, MPD Friction Pad, Aug. 19, 1988.
Crown Products 2002 (www.crownprod.com).
FNN-Fleet NewsNet: Company car fleet management solutions pp. 1-4, Roadtest (www.fleetnewsnet.co.uk).
http://www.bracketron.com/?catid=11, Bracketron, Inc., GPS Accessories, accessed Nov. 2009, 2 pages.
http://www.bracketron.com/index.php?catied=16&pid=24, Bracketron, Inc., Nav-Mat Portable GPS Dash Mount, accessed Nov. 2009, 2 pages.
http://www.bracketron.com/?includes/phpThumb/phpThumb.php?src=../../images/_products/UFM-100-B.... Bracketron, Inc., Nav-Mat, accessed Nov. 2009, 1 page.
Wheatley, U.S. Appl. No. 12/205,059, office action issued Mar. 23, 2009.
Dashmat Ultimat the revolutionary breakthrough dashboard cover, Saddleman, INc. 1998, 2 pages.
1999 Catalogue, Canadian Tire, 2 pages.

* cited by examiner

*Primary Examiner* — Callie E Shosho
*Assistant Examiner* — Cheng Huang
(74) *Attorney, Agent, or Firm* — Thorpe North & Western LLP

(57) ABSTRACT

A frictional holding pad removably attaches handheld items, such as a cell phone, to a surface, such as a dash, to allow storage of handheld items on the surface with the pad to prevent the items from shifting or sliding due to the movement of the support surface. A smoother application side of the pad clings to the handheld item by specific or mechanical adhesion, and a contoured exposed side of the pad clings to the surface by specific or mechanical adhesion. The smoother application side of the pad can have a greater surface area than the contoured exposed side so the pad remains with the handheld item when removed from the surface. Indicia can be formed on the pad. The pad can be translucent or transparent. The pad can include an expanded vinyl material or a polyurethane material.

23 Claims, 5 Drawing Sheets

FRICTIONAL HOLDING PAD

This is a continuation-in-part of U.S. patent application Ser. No. 11/021,560, filed Dec. 22, 2004 now U.S. Pat. No. 7,252,867; which is a continuation-in-part of U.S. patent application Ser. No. 10/684,008, filed Oct. 10, 2003 now U.S. Pat. No. 7,125,602; which is a divisional of application Ser. No. 10/209,940, now U.S. Pat. No. 6,673,409, filed Jul. 30, 2002; which claims benefit of U.S. Provisional Patent Application Nos. 60/308,955, filed Jul. 31, 2001, and 60/344,571, filed Dec. 28, 2001, which are all incorporated herein by reference in their entireties and for all purposes.

BACKGROUND OF THE INVENTION

1. Field of the Invention

The present invention relates generally to a frictional holding pad, particularly useful to releasably secure an object, such as a cell phone, to a surface, such as a vehicle dash.

2. Related Art

It is often desirable to secure a handheld item, such as a cell phone, to another surface, such as a movably vehicle dash. For example many handheld items carried in day-to-day life must often be temporarily stored to free an individual's hands for other tasks. One common example of such a situation arises when an individual enters a vehicle. Because most vehicles involve stop-and-go or side-to-side motion, placing such items on open surfaces raises the risk that the items will slide off the open surface during operation of the vehicle. The movement of such items can cause damage to the item itself, damage to the vehicle or interior accessories, and posses a safety problem. For example, a cell phone may break if it falls to the floor, or may fall onto another object, such as a laptop computer, causing further damage. In addition, a driver may be distracted by trying to retrieve the phone from the floor. Hence, storing such items on open surfaces is generally not a viable option.

While most vehicles include storage locations for such personal items, storing the items generally requires the inconvenience of opening a compartment, such as a glove box in an automobile, and storing the items along with the other items already contained within the compartment. Once stored in such compartments, items are not visible to an individual and are not easily accessible should the individual wish to quickly access the items.

Conventional adhesive devices, however, often utilize a chemical bond that is permanent in nature so that removal of the adhesive device either damages the object on which it was used, or leaves a residue on the object that is difficult to remove without damaging the object. Similarly, mechanical retaining devices often are mounted to an object in such a way as to permanently alter the object. There are also magnetic devices in which two pieces are adhered to a vehicle dashboard and cellular phone, and then magnetically couple together.

Other solutions to the problem have been proposed. Most notably, special mounting devices have been used to secure items in the car. Such mounting devices typically have a base that is secured to some object in the vehicle, and a receiving portion to receive and hold the item. For example, some devices are configured to receive and hold a cell phone. Other devices are configured to receive and hold sunglasses. One disadvantage with such mounting devices is that they are typically customized to hold a particular item, or type of item, and are ill suited for other items. For example, a mounting device for a cell phone may not adequately hold sunglasses. Thus, it may be necessary to have several mounting devices within the vehicle, one for a cell phone, one for sunglasses, one for a GPS unit, etc.

Such mounting devices have several other disadvantages. For example, having several mounting devices in a vehicle can make the vehicle appear cluttered. In addition, such mounting devices are typically sold as accessories, and thus add expense. Another disadvantage with such mounting devices is that they can permanently alter and devalue the object to which they are attached. Furthermore, such mounting devices are only accessible at the locations they are secured, while handheld devices can be transported to different locations, such as other vehicles. Thus, additional mounting devices must be located wherever a handheld item needs to be secured from undesired motion.

In addition, appliqués have been proposed that adhere to the handheld item to increase grip. For example, see international patent application nos. PCT/US2004/006552 (WO 2005/026434) and PCT/US2003/004690 (WO 2004/050343). Again, such appliqués adhere to the handheld item and are difficult to remove.

SUMMARY OF THE INVENTION

It has been recognized that it would be advantageous to develop a device and method to removably attach handheld items to a surface without permanently altering the handheld item or surface. In addition, it has been recognized that it would be advantageous to develop a device and method to removably attach handheld items to a surface in a vehicle without permanently altering the vehicle surface and allowing for ready retrieval of the object. In addition, it has been recognized that it would be advantageous to develop such a device and method capable of being used with various different handheld items. In addition, it has been recognized that it would be advantageous to develop such a device and method that would remain with the handheld item. In addition, it has been recognized that it would be advantageous to develop such a device and method capable of providing advertisement, and/or personalization or customization.

The invention provides a frictional holding device that can be disposed on a handheld item, and can removably secure the handheld item to a surface. The device can have a pad with a smoother application side that is removably attachable to the handheld item. The pad can also have a contoured exposed side that is removably attachable to the surface when the handheld item and pad are disposed on the surface. The smoother application side is smoother than the contoured exposed side, and contacts and clings to the handheld item by specific or mechanical adhesion. The contoured exposed side is contoured over a majority of the contoured exposed side, and at least partially contacts and clings to the surface by specific or mechanical adhesion. The contoured exposed side can have a plurality of protrusions or indentations.

In accordance with another aspect of the present invention, the contoured exposed side has an outermost surface area less than an outermost surface area of the smoother application side.

In accordance with another aspect of the present invention, the pad can be bendable and can conform to profile changes in the handheld item or the surface. The pad can be formed of expanded vinyl.

In accordance with another aspect of the present invention, at least a portion of the pad can be translucent. In another aspect, the pad is at least translucent. In another aspect, the pad can be formed of polyurethane.

The invention also provides a method for releasably securing a handheld item to a surface without marring or altering the handheld item or the surface. A contact surface of a smoother application side of a pad is placed on the handheld item. The contact surface of the smoother application side of the frictional holding device clings to the handheld item by specific or mechanical adhesion without marring or altering the handheld item. The pad further having an opposite contoured exposed side. The handheld item with the frictional holding device is placed on the surface with a contact surface of the opposite contoured exposed side of the pad clinging to the surface by specific or mechanical adhesion. The contoured exposed side has a contoured surface extending over a majority of the contoured exposed side. The contact surface area of the contoured exposed side has less contact surface area than the contact surface of the smoother application side. The smoother application side has a smoother contact surface than the contact surface of the contoured exposed side. The handheld item with the pad is removed from the surface without marring or altering the surface, and with the pad remaining on the handheld item Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 5 is a detailed cross-sectional view of the frictional holding pad of FIG. 1a;

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1-5, a frictional holding device, indicated generally at 10, in accordance with the present invention is shown for releasably retaining, or selectively maintaining, a handheld item 14 on a surface 16, or support surface. The frictional holding device 10 can have a pad 12 is disposed on the handheld item 14, and clinging to the item 14 by specific or mechanical adhesion. The handheld item can be planer or curved. The handheld item 14 can be any of a number of items, including for example, a cell phone, a personal digital assistant (PDA), a pair of sunglasses, a pair of eye glasses, a global positioning system (GPS), a radio, a two-way radio, a citizens band (CB) radio, a walkie-talkie, a camera, a video recorder, a cassette player/recorder, a mini-cassette recorder, a DVD player, a mini-disk player, a digital music player, a portable television (TV), etc. Securing personal handheld items in a vehicle is one field that may benefit from use of the present invention. It will be appreciated that other items can be selectively secured to the surface 16 by the pad 12. In addition, it will be appreciated that the pad can be disposed on other surfaces.

Figure 1A:
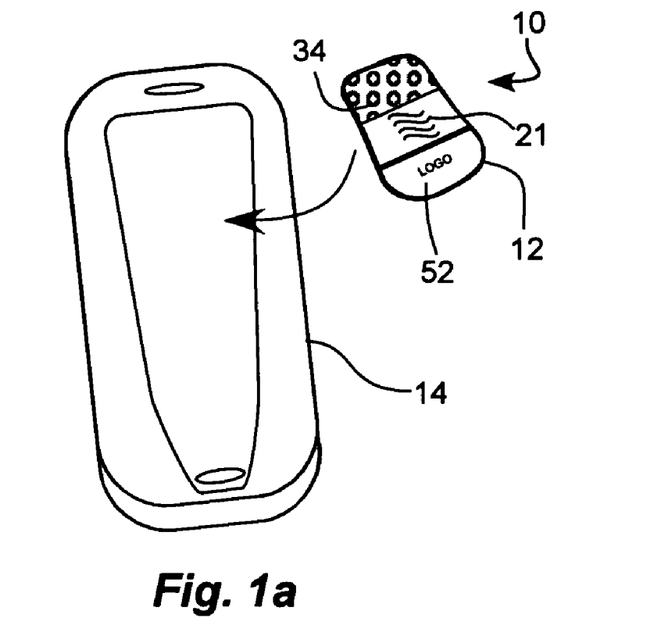
FIG. 1a is a perspective view of a frictional holding device in accordance with an embodiment of the present invention, shown before being removably attached to a handheld item.
Figure 1B:
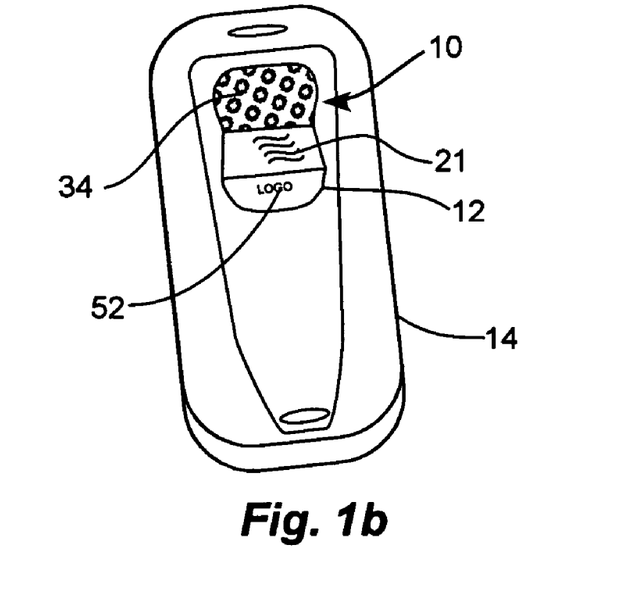
FIG. 1b is a perspective view of the frictional holding device of FIG. 1a, shown disposed on a handheld device.
Figure 2A:
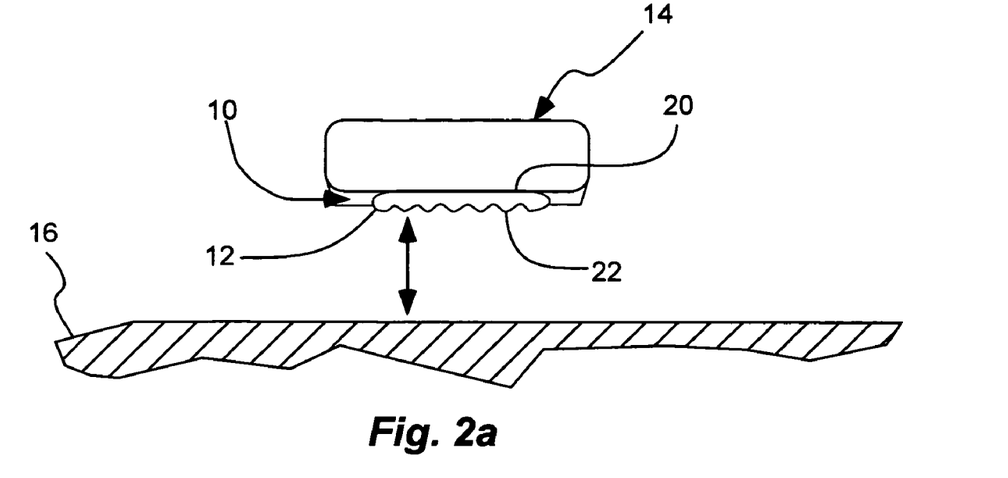
FIG. 2a is a side view of the frictional holding pad of FIG. 1a shown disposed on a handheld device and being removably disposed on a surface.
Figure 2B:
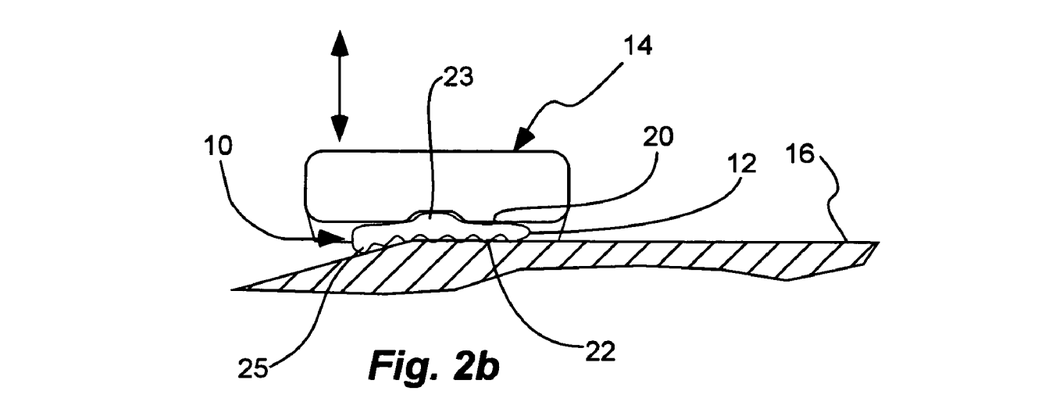
FIG. 2b is a side view of the frictional holding pad of FIG. 1a shown disposed on a handheld device and disposed on a surface.
Figure 2C:
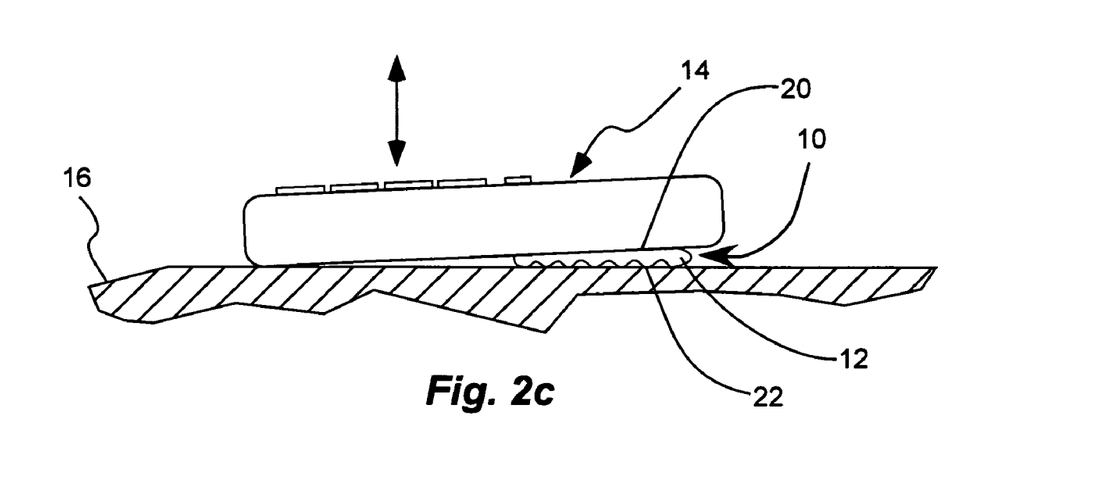
FIG. 2c is a side view of the frictional holding pad of FIG. 1a shown disposed on a handheld device and disposed on a surface.
Figure 3:
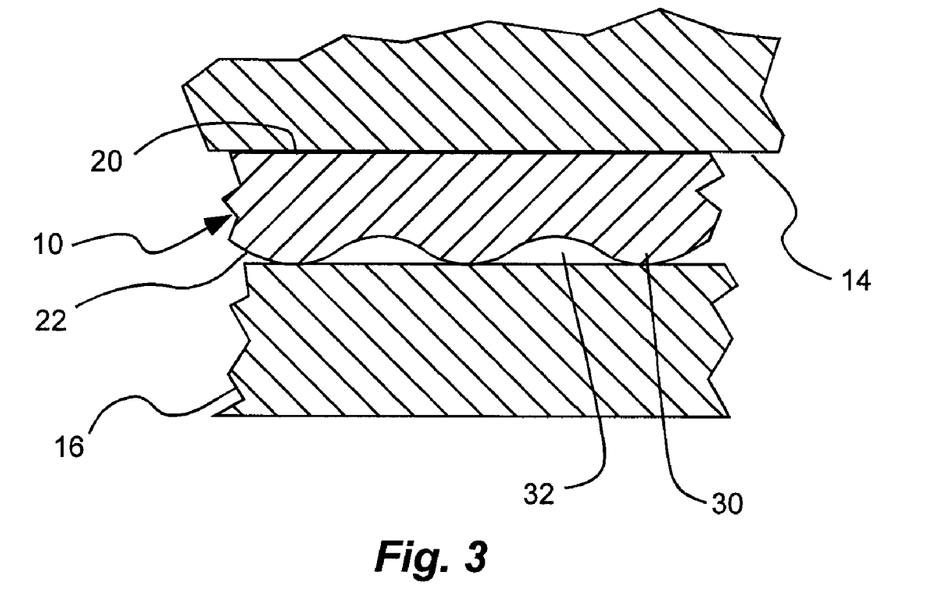
FIG. 3 is a detailed, partial cross-sectional view of the frictional holding pad of FIG. 1a shown disposed on a handheld device and on a surface.

The pad 10 has a smoother application side 20 and a contoured exposed side 22. The smoother application side 20 can be removably attachable to the handheld item 14 despite movement of the handheld item 14. The contoured exposed side 22 can be removably attachable to the surface 16 despite movement of the surface 16. The smoother application side 20 of the pad 10 can be "tacky", such that the pad 12 tends to cling to the handheld item 14 by specific or mechanical adhesion, as opposed to a chemical or adhesive manner. Additionally, the smoother application side 20 can be smoother than the contoured exposed side 22, or have a more shiny appearance. The contoured exposed side 22 can also be "tacky", such that the pad 12 can stick, or cling to the surface 16 when the handheld item 14 and the pad 12 are disposed on the surface 16, as shown in FIGS. 2a and 2b.

The smoother application side 20 can also have a greater surface area in contact with the handheld item 14 to provide a greater specific or mechanical adhesion that the contoured exposed side 22 with the surface 16. Thus, the pad 12 remains on the handheld item 14 when the handheld item 14 is removed from the surface 16, rather than removing the handheld item 14 from the pad 12 when the handheld item 14 is picked up from the surface. The smoother application side 20 can have a contact surface or an outermost surface that contacts the handheld item.

The contoured exposed side 22 can have contours or texture (indicated at 21) that creates a contact surface or outermost surface that is reduced with respect to the contact surface or outermost surface of the application side 20. The contact surface or outermost surface of the contoured exposed side 22 contacts the surface 16. Thus, the handheld item 14 and the pad 12 can be removed from the surface 16 without the pad 12 sticking to the surface 16 or being removed from the handheld item 14.

The pad 12 can be flexible and capable of bending (indicated at 23 and 25 in FIG. 2b) to conform to curves or details in the handheld item 14 or surface 16. The pad 12 also can have a planer configuration and can be used on planar surfaces. The pad 12 can be provided in an original planar configuration, supported by a paper backing or release layer 24.

Figure 4:
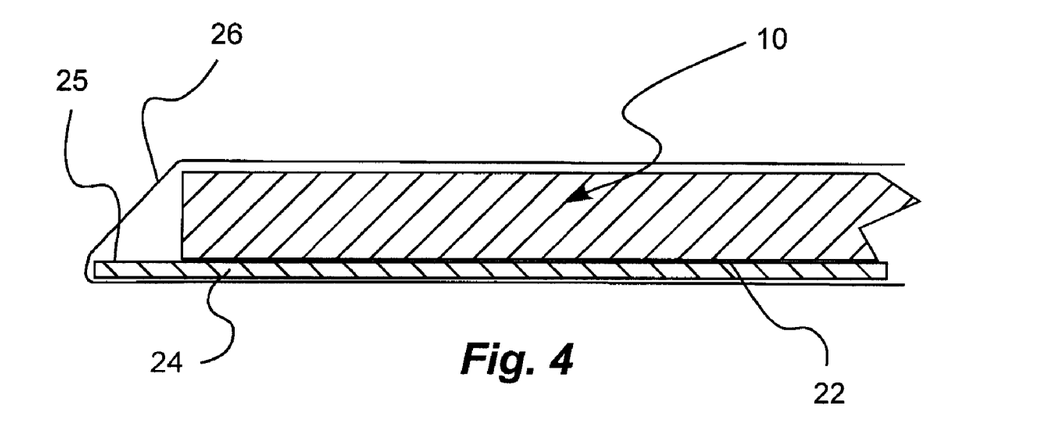
FIG. 4 is a detailed, partial cross-sectional view of the frictional holding pad of FIG. 1a with a release layer and a wrapper in accordance with an embodiment of the present invention.

The release layer 24 prevents or resists the pad 12 or smoother application surface 20 from sticking or clinging to any wrapper or packaging of the pad. The release layer 24 may be stiffer than the pad 12 to maintain the pad in a planar configuration. In addition, the release layer 24 can include indicia thereon, such as instructions for use and care of the pad 12. The release layer 24 can include a tab 25 protruding therefrom beyond a perimeter of the pad 12 to facilitate removal of the release layer from the pad. Upon removal of the release layer 24, the pad 12 is flexible to enable conformity with a wide array of curved surfaces. In addition, removal of the release layer 24 exposes the smoother application side 20 of the pad 12 to be disposed on the handheld item 14. A removable wrapper 26 can be formed around the pad 12 and the backing layer 24 to protect the pad prior to use. The wrapper 26 and backing layer 24 can be removed prior to placing the pad 12 on the handheld item 14.

The contoured exposed surface 22 of the pad 12 can be non-chemically adherable to surfaces 16 placed thereon. Like the smoother application side 20, the contoured exposed side 22 can be "tacky", such that the pad 12 tends to cling to the surface 16 by specific or mechanical adhesion, as opposed to a chemical manner. As stated above, the contoured exposed side 22 can be contoured to include protrusions 30 and/or indentations 32. The protrusions 30 and indentations 32 can be rounded or curvilinear to form a more gradual transition between the protrusions and indentations, and create a contour on the contoured exposed side 22 that is wavy. The contour, or protrusions 30 and/or indentations 32, can extend at least substantially across the contoured exposed side 22 of the pad 12.

The contour of the exposed side 22 creates a contact surface on the tops of the protrusions 30 that contacts the surface 16. The contoured exposed side 22 thus has less surface area in contact with the surface 16 than the smoother application side 22 has in contact with the handheld item 14. Thus, a greater clinging force is exerted on the handheld item 14 than on the surface 16 such that the handheld item 14 and the pad 12 can be removed from the surface 16 without removing the pad 12 from the handheld item 14. In addition, the handheld item 14 can be larger than the pad 12 itself, thus also contributing to more surface contact between the smoother application side 20 and the item 14.

Figure 5:
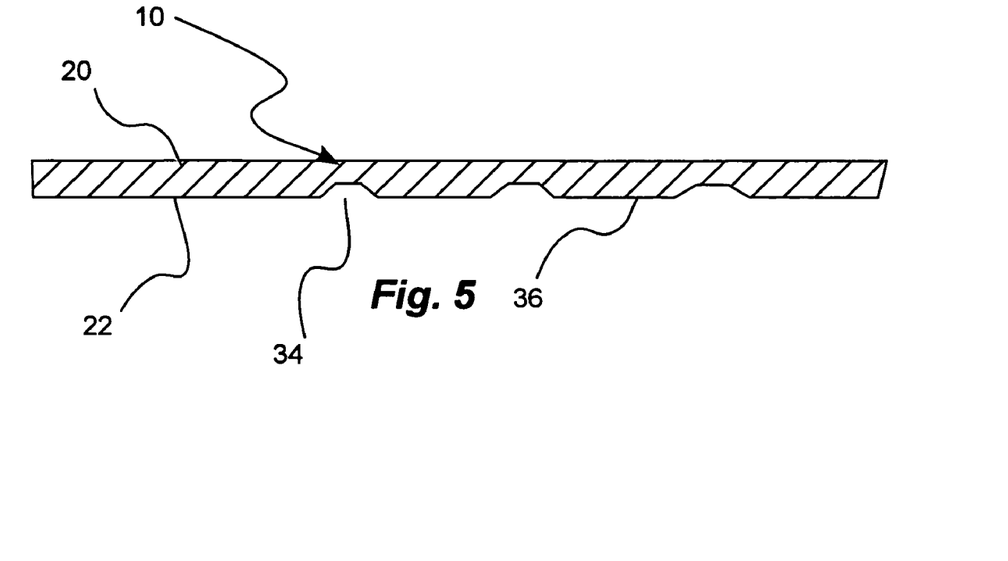

Referring to FIG. 5, an array or matrix of a plurality of indentations 34 can be formed in the contoured exposed side 22 of the pad 12 creating a plurality of protrusions 36 therebetween. The indentations 34 and protrusions 36 can be more straight, linear or recta-linear to create a more modern appearance.

The pad 12 can be formed of or can include an expanded vinyl material. It has been found that the expanded vinyl material provides a good frictional or "tacky" quality that remains disposed on the handheld item 14, and that retains the item on the surface 16. In addition, it has been found that such an expanded vinyl material typically can be disposed on the handheld item 14 or the surface 16 without marring or otherwise chemically interfering with the material of many items, such as cell phones, or surfaces, such as vehicle dashboards. It will be appreciated that many surfaces, such as a vehicle dashboard, have a finished surface configured to be aesthetically pleasing and luxurious. Such surfaces can be formed of a plastic or leather material, and can be expensive to replace or repair. In addition, it will be appreciated that some surfaces are subjected to extreme conditions, such as heat and sunlight. It has been found that the expanded vinyl material not only provides the required retention of objects and fixed relationship with the surface, but also typically does so without chemically interacting with the material of surface, or otherwise damage the surface.

The expanded vinyl material of the frictional holding pad 12 forms a temporary, non-chemical, specific or mechanical adhesive bond with both 1) the handheld item 14 removably attached the smoother application side 20, and 2) the surface 16. The pad 12 can be removed from the handheld item 14 or surface 16 without leaving behind any residue and without damaging the pad. In this manner the handheld item and pad 12 can be easily moved to any location the user desires. Additionally, the pad 12 can be removed from one item 14 and placed on another. Because the pad 12 is made from expanded vinyl, it can be easily cleaned with soap and water, and still retain its tackiness, and is thus reusable.

The expanded vinyl material more specifically can include: diisodecy/phlthalate; polymeric plasticer; a UV stabilizer; a vinyl hear stabilizer; a blowing agent for vinyl plastisol; and vinyl resin (plastic). The expanded vinyl material can have a weight between approximately 10 and 20 ounces per square yard; more preferably between approximately 12 and 18 ounces per square yard; and most preferably between approximately 14 and 16 ounces per square yard. The frictional holding device 10 can have a thickness between approximately 0.03 and 0.09; more preferably between approximately 0.04 and 0.08 inches; and most preferably between approximately 0.05 and 0.06 inches.

The pad 10 can be formed of different layers with different materials. For example, the pad 10 can have a skin layer formed on the smoother application side 20 formed of a different material than the rest of the pad. For example, the material of the skin layer can include: aqua ammonia ($NH_4OH$); azardine; rubber; color; and body for thickening. The skin layer can have a thickness between 0.003 and 0.006 inches, and more preferably between 0.004 and 0.005 inches.

In addition, a perforated pattern can be formed in the pad 10 to ornamentally decorate the contoured exposed surface 22. The pad 12 can be die cut from a larger sheet of material. The perforated pattern can similarly be formed by a die.

The frictional holding pad 12 also can include indicia 52 formed on the contoured exposed surface 22. The indicia 52 can be formed by ink, or ink-like materials, printed on the upper surface. The indicia 52 can include: a logo, an advertisement, an instruction, a promotion, a company name, and a product name. Thus, the frictional holding device 10 can be used as a promotional item by including a business or product logo or name. It will be appreciated that such frictional holding devices can be inexpensively manufactured, and in use, can occupy a position of high and frequent visibility. Thus, such frictional holding devices can be inexpensively manufactured, and given away as promotional items. In addition, the indicia 52 can include instructions that can be related or unrelated to the use or care of the pad. For example, the instructions can include how to use or place the pad, and how to clean or wash the pad. As another example, the instructions can relate to the use of something other than the pad 12 itself, such as an item to be disposed thereon. Thus, the pad serves dual functions, both as a frictional holding pad to secure and item, and providing ready instructions. The instructions can relate to the use of the item to be disposed thereon. Thus, such a pad can be provided with an item, or provided for use with such an item. For example, the instructions can relate to the use of a cellular phone. In addition, the indicia can include warning, such as warning not to drive while talking on the phone.

Figure 6:
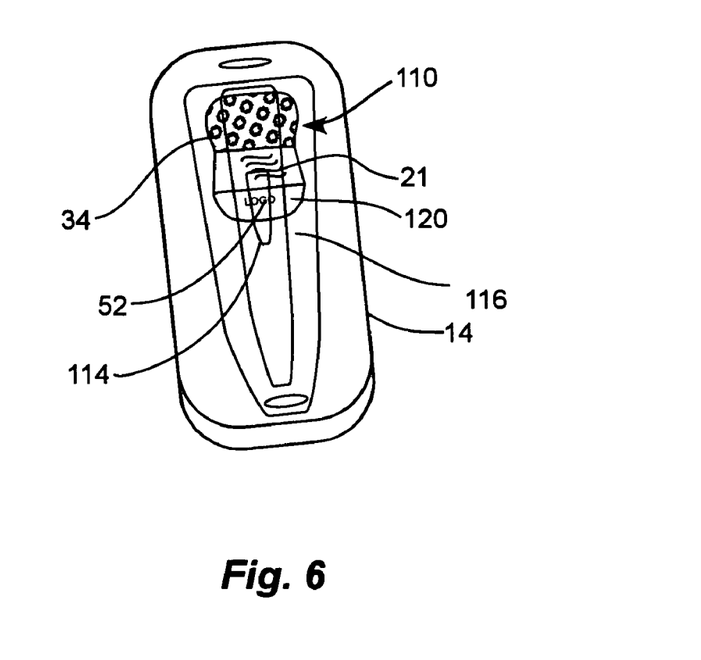
FIG. 6 is a perspective view of another frictional holding pad in accordance with another embodiment of the present invention, shown disposed on a handheld item.

Referring to FIG. 6, another frictional holding device, indicated generally at 110, is shown which is similar in many respects to the frictional holding pad described above and shown in the other drawings. The device 110 can have a pad 112 that can be translucent or transparent. Thus, surface details 114 on the handheld item 14 can be viewed or are visible through the pad 112 (indicated at 116 in FIG. 6). The translucent or transparent nature of the pad 112 can make the pad blend-in or match the handheld item 14 because of the surface details 114 showing through the pad. If the pad is translucent, it can also include a light coloring. Such coloring can help visually distinguish the pad 112 from the handheld item. Thus, a translucent pad can both blend with the handheld item 14 while still being visually distinguishable therefrom.

The pad 112 can be formed of, or can include, a translucent or transparent material. For example, the pad 112 can include a molded polyurethane material. It has been found that the polyurethane material provides both a frictional or "tacky" quality that remains disposed on the surface, and that is transparent or translucent. In addition, the polyurethane material can be easily cleaned with soap and water.

The pad 112 also can include indicia 52 formed thereon. The indicia 52 can be formed on the smoother application side 20 of the pad 112 and still be visible because the pad is translucent or transparent. Forming the indicia 52 on the smoother application side 20 of the pad can also protect the indicia from wear or removal.

The pad 112 also can include a printable portion or section 120 that can include a substantially flat area on the contoured exposed surface 22. Thus, the contoured exposed surface 22 can be substantially contoured, but still have a flat printable portion or section 120 for indicia 52.

The pad 112 preferably has a low profile, or is thin, having a thickness of less than approximately ⅛th of an inch. Thus, the handheld item 14 is kept close to the surface 16 without extending where the handheld item might interfere with the operation of the vehicle.

Thus, the pad 112 can be a thin sheet of polyurethane material with a substantially smooth and continuous application side 20 with a tacky characteristic to non-chemically and removably adhere to the handheld item 14, and a contoured exposed side 22 also with a tacky characteristic to non-chemically and removably adhere to the surface 16. The pad or polyurethane material can be translucent or transparent, and can include printing on either the upper or lower surface.

The frictional holding devices described above can be sized and shaped to match the desired handheld item 14. For example, the pads can be sized to fit on typical cellular phones, digital music players, etc. As an example, a size less than two square inches has been found to be useful. In addition, the pads can be sized or shaped to match other designs, such as logos. Additionally, the frictional holding devices can be square, rectangular, circular, polygonal, or the like.

The frictional holding devices described herein can also be formed from a single solid or consistent layer, without adhesives or laminates. Additionally, the frictional holding devices do not contain any adhesive chemicals either within the pad material, or affixed to any external surface of the pad. Thus, the frictional holding devices frictionally cling to the handheld items solely by specific or mechanical adhesion.

Figure 7:
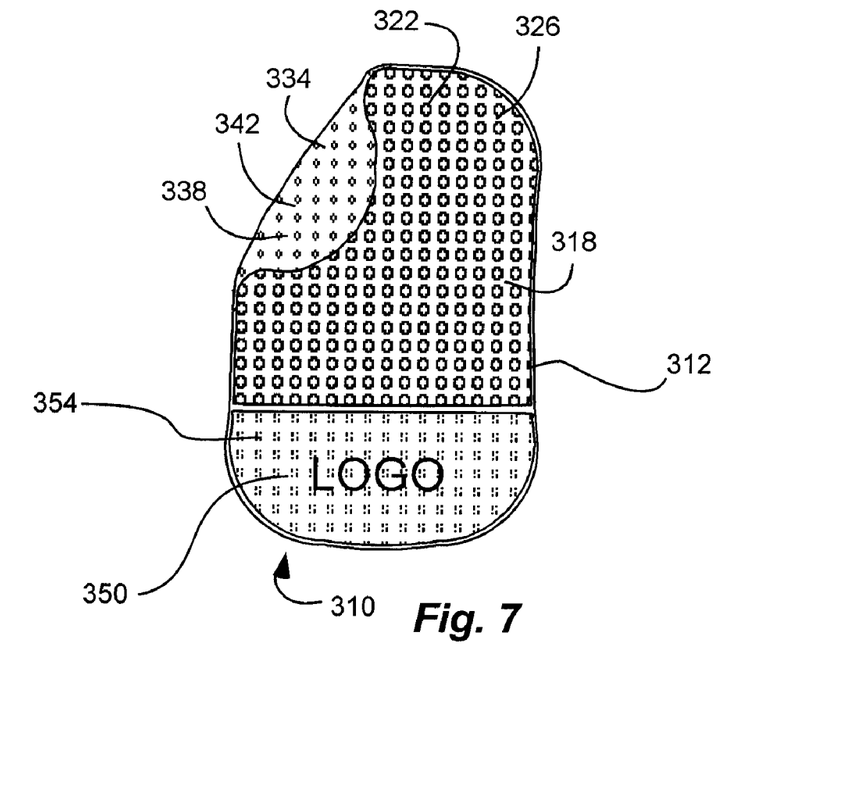
FIG. 7 is a top view of another frictional holding pad in accordance with an embodiment of the present invention shown with a corner pulled-up to reveal a bottom surface.
Figure 8:
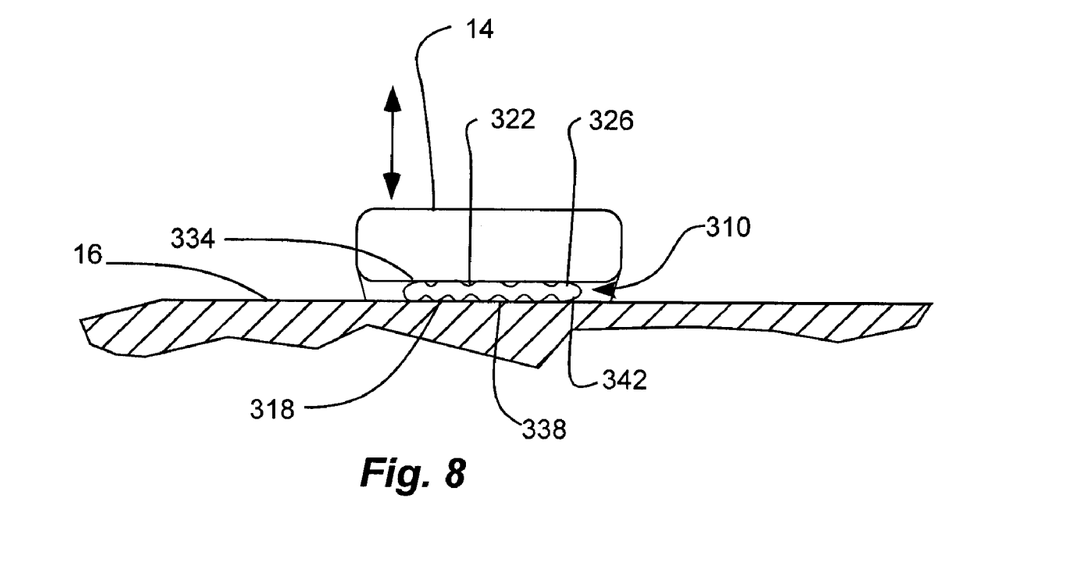
FIG. 8 is a cross-sectional side view of the frictional holding pad of FIG. 7, shown disposed on a handheld item and on a surface.

Referring to FIGS. 7-8, another frictional holding device 310 is shown that is similar in most respects to those described above. The frictional holding device 310 can also have a pad 312. The pad 312 has an application side 334 and an exposed side 318. The application side 334 can be substantially flat, as described above, to be disposed on the handheld item 14. Alternatively, the application side 334 can be contoured, as described below. The exposed side 318 can be different from the application side 334 and can be contoured to removably attach to the surface 16. At least a substantial portion of the exposed side 318 can be contoured. The contour can include a plurality of protrusions 322 and/or indentations 326. The protrusions 322 can extend from the exposed side forming the indentations 326 therebetween, or the indentations 326 can extend into the exposed side forming the protrusions 322 therebetween. As discussed above, the contour can be formed by an array or matrix of indentations extending across a majority of the exposed side. Also as described above, the application side has a contact surface or outermost surface that is greater than a contact surface or outermost surface of the exposed side Referring to FIGS. 7 and 8, the application side 334 also can be contoured. The contour can include a plurality of protrusions 338 and/or indentations 342. The protrusions and indentations of the application side 334 can be similar to those of the exposed side 318, but can provide a contact surface to contact and frictionally cling to the handheld item 14. The contact surface of the application side 334 can have a greater surface area than the contact surface of the exposed side. For example, the protrusions 338 of the application side 334 can be larger than the protrusions 322 of the exposed side 318. Or the indentations 342 of the application side 334 can be larger than the indentations 322 of the exposed side 318.

The protrusions 322 or 338 of the exposed or application sides 318 or 334 can be substantially flat, or the contact surfaces can be flat to maximize the surface area in contact with the surface 16 or handheld item 14.

The pad can formed of stretched vinyl or polyurethane, which has been found to provide tackiness without marring most vehicle surfaces. In the case the pad is formed from polyurethane, the pad can be translucent or transparent.

Indicia 350 can be formed on the top surface 318 of the pad 310 or 314. The indicia can include: a logo, an advertisement, an instruction, a promotion, a company name, and a product name. The top surface 318 can include a first or flat section 354 that is flat, and upon which the indicia 350 can be disposed. In addition, the top surface 318 can include a second or remaining section that is contoured and configured to receive the item.

A method for releasably securing an item on a vehicle surface without marring or altering the handheld item or the surface includes placing a frictional holding device on the handheld item. The frictional holding device can have a pad with a smoother application side and a contoured exposed side. The contoured exposed side can have a contoured surface extending over a majority of the contoured exposed side and a contact surface. The smoother application side can have a smoother contact surface than the contact surface of the contoured exposed side, and can be capable of contacting and frictionally clinging to the handheld item by specific or mechanical adhesion without marring or altering the item. The smoother application side can have a greater contact surface area than the contact surface area of the contoured exposed side.

The contact surface of the smoother application side can be placed on the handheld item. The contact surface of the smoother application side of the frictional holding device can cling to the handheld item by specific or mechanical adhesion. The handheld item with the frictional holding device can be placed on a surface with the contact surface of the contoured exposed side of the frictional holding device clinging to the surface by specific or mechanical adhesion. The handheld item with the frictional holding device can be removed from the surface without marring or altering the surface, and the frictional holding device will remain on the handheld item.

Additionally, the surface can be moved with the handheld item secured to, and moving with, the surface by the frictional holding device. The pad can also include a flexible material and can be bent to conform to changes in a profile of the handheld item, the pad including a flexible material. Furthermore, a backing layer can be removed from the contact surface of the smoother application side of the pad prior to placing the frictional holding device on the handheld item.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A frictional holding device in combination with a handheld item and removably securing the handheld item to a surface, comprising:
    a) the handheld item being selected from the group consisting of: a cell phone, a personal digital assistant, a global positioning system, a radio, a two-way radio, a citizens band radio, a walkie-talkie, a camera, a video recorder, a cassette player/recorder, a mini-cassette recorder, a DVD player, a mini-disk player, a digital music player, and a portable television;
    b) a pad, having a smoother application side, removably attached to a single side of the handheld item, and a contoured exposed side;
    c) the smoother application side being smoother than the contoured exposed side and being tacky to contact and cling to the single side of the handheld item by specific or mechanical adhesion;
    d) the contoured exposed side being contoured over a majority of the contoured exposed side; and
    e) the contoured exposed side including a plurality of separate and discrete indentations.

2. The device in accordance with claim 1, wherein the contoured exposed side has an outermost surface area less than an outermost surface area of the smoother application side.

3. The device in accordance with claim 1, wherein the pad is bendable and includes a flexible material conforming to surface profile changes of the handheld item.

4. The device in accordance with claim 1, wherein the smoother application side has a greater specific or mechanical adhesion than the contoured exposed side.

5. The device in accordance with claim 1, further comprising:
    indicia, formed on the contoured exposed side of the pad, the indicia being selected from the group consisting of: a logo, an advertisement, an instruction, a promotion, a company name, and a product name.

6. The device in accordance with claim 1, wherein the contoured exposed side includes at least two laterally adjacent and bordering sections, including a first section that is substantially flat and has indicia thereon, and a second section that is contoured.

7. The device in accordance with claim 1, wherein the pad includes an expanded vinyl material.

8. The device in accordance with claim 1, wherein the pad includes a polyurethane material.

9. The device in accordance with claim 1, wherein at least a portion of the pad is at least translucent.

10. The device in accordance with claim 9, further comprising indicia, formed on the smoother application side of the pad, and visible through the contoured exposed side of the pad.

11. The device in accordance with claim 1, wherein:
    the surface receiving the contoured exposed side of the pad is selected from the group consisting of: a dashboard of a vehicle, a console of a vehicle, and an armrest of a vehicle.

12. A frictional holding device in combination with a handheld item and removably securing the handheld item to a surface, comprising:
    a) the handheld item being selected from the group consisting of: a cell phone, a personal digital assistant, a global positioning system, a radio, a two-way radio, a citizens band radio, a walkie-talkie, a camera, a video recorder, a cassette player/recorder, a mini-cassette recorder, a DVD player, a mini-disk player, a digital music player, and a portable television;
    b) a pad, formed from a layer of expanded vinyl, and having a smoother application side disposed on a single side of the handheld item, and a contoured exposed side;
    c) the smoother application side having a contact surface that is tacky to contact and cling to the single side of the handheld item by specific or mechanical adhesion; and
    d) the contoured exposed side having a contoured profile with a contact surface configured to contact and cling to the surface by specific or mechanical adhesion wherein the contoured exposed side includes a plurality of separate and discrete indentations.

13. The device in accordance with claim 12, wherein the contoured exposed side has an outermost surface area less than an outermost surface area of the smoother application side.

14. The device in accordance with claim 12, wherein:
    the surface receiving the contoured exposed side of the pad is selected from the group consisting of: a dashboard of a vehicle, a console of a vehicle, and an armrest of a vehicle.

15. A frictional holding device in combination with a surface of a dashboard, a console or an armrest of a vehicle, and a handheld item, and removably securing the handheld item to the surface, comprising:
    a) the handheld item being selected from the group consisting of: a cell phone, a personal digital assistant, a global positioning system, a radio, a two-way radio, a citizens band radio, a walkie-talkie, a camera, a video recorder, a cassette player/recorder, a mini-cassette recorder, a DVD player, a mini-disk player, a digital music player, and a portable television;
    b) a pad, having an application side, removably attached to a single side of the handheld item, and an exposed side, removably attached to the surface;
    c) the exposed side having an outermost surface in contact with the surface of the dashboard, the consol or the armrest less than an outermost surface of the application side in contact with the handheld item; and
    d) the exposed side being tacky and contacting and clinging to the surface of the dashboard, the console or the armrest by specific or mechanical adhesion wherein the exposed side is contoured and has a plurality of separate and discrete indentations and wherein the application side is smoother than the exposed side.

16. The device in accordance with claim 15, wherein the pad is bendable and includes a flexible material conforming to surface profile changes of the handheld item.

17. The device in accordance with claim 15, wherein the application side has a greater specific or mechanical adhesion than the exposed side.

18. The device in accordance with claim 15, further comprising:
   indicia, formed on the exposed side of the pad, the indicia being selected from the group consisting of: a logo, an advertisement, an instruction, a promotion, a company name, and a product name.

19. The device in accordance with claim 15, wherein the exposed side includes at least two sections, including a first section that is substantially flat and has indicia thereon, and a second section that is contoured.

20. The device in accordance with claim 15, wherein the pad includes an expanded vinyl material.

21. The device in accordance with claim 15, wherein the pad includes a polyurethane material.

22. The device in accordance with claim 15, wherein at least a portion of the pad is at least translucent.

23. The device in accordance with claim 22, further comprising indicia, foamed on the application side of the pad, and visible through the exposed side of the pad.

* * * * *